(12) United States Patent
Lee et al.

(10) Patent No.: US 7,714,974 B2
(45) Date of Patent: May 11, 2010

(54) LIQUID CRYSTAL DISPLAY DEVICE AND METHOD OF FABRICATING THE SAME

(75) Inventors: Gun Hee Lee, Gyeongsangbuk-do (KR); Sung Il Park, Deagu (KR)

(73) Assignee: LG Display Co., Ltd., Seoul (KR)

( * ) Notice: Subject to any disclaimer, the term of this patent is extended or adjusted under 35 U.S.C. 154(b) by 717 days.

(21) Appl. No.: 11/475,217

(22) Filed: Sep. 20, 2006

(65) Prior Publication Data

US 2007/0139600 A1 Jun. 21, 2007

(30) Foreign Application Priority Data

Dec. 20, 2005 (KR) ...................... 10-2005-0126256

(51) Int. Cl.
*G02F 1/1339* (2006.01)

(52) U.S. Cl. ....................................... 349/153; 349/151

(58) Field of Classification Search ....................... None
See application file for complete search history.

(56) References Cited

U.S. PATENT DOCUMENTS

| 2002/0080461 A1* | 6/2002 | Karasawa et al. ............ 359/254 |
| 2004/0150771 A1 | 8/2004 | Lee |
| 2006/0215102 A1* | 9/2006 | Otose et al. .................. 349/151 |
| 2007/0052909 A1* | 3/2007 | Chou et al. .................. 349/155 |
| 2008/0305281 A1* | 12/2008 | Li ............................... 428/1.5 |

FOREIGN PATENT DOCUMENTS

JP 8-95076 A 12/1996

* cited by examiner

*Primary Examiner*—Hemang Sanghavi
(74) *Attorney, Agent, or Firm*—Holland & Knight LLP

(57) ABSTRACT

A liquid crystal display device includes a common electrode on an upper substrate, a gate driver on a lower substrate facing an upper substrate, an insulating pattern on the common electrode, and a conductive sealant for bonding the upper and lower substrates together that overlaps the gate driver.

8 Claims, 15 Drawing Sheets

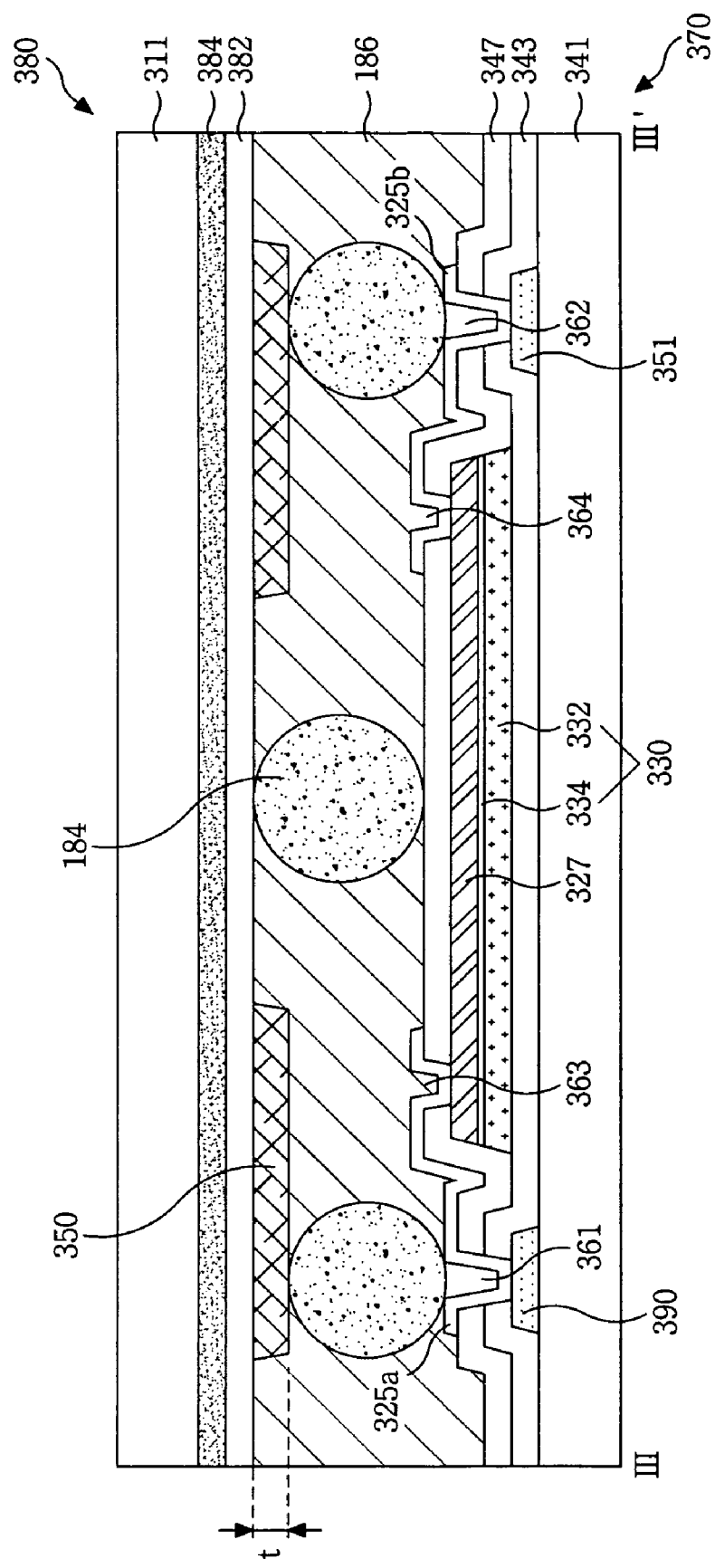

LIQUID CRYSTAL DISPLAY DEVICE AND METHOD OF FABRICATING THE SAME

This application claims the benefit of the Korean Patent Application No. P2005-0126256 filed in Korea on Dec. 20, 2005 which is hereby incorporated by reference in its entirety.

BACKGROUND OF THE INVENTION

1. Field of the Invention

The present invention relates to a display device, and more particularly to a liquid crystal display device and a method of fabricating the same. Although the present invention is suitable for a wide scope of applications, it is particularly suitable for reducing a fabrication time of the liquid crystal display device, and preventing a short circuit between a common electrode of an upper substrate and a drive circuit of a lower substrate.

2. Description of the Related Art

In general, a liquid crystal display device controls the light transmittance of liquid crystal by use of electric field, thereby displaying a picture. FIG. 1 is a plan view of a liquid crystal display device in the related art. The liquid crystal display device includes a thin film transistor array substrate 70 and a color filter array substrate 80 with a liquid crystal 50 therebetween, as shown in FIG. 1. The thin film transistor array substrate 70 includes a gate line 2 and a data line 4 which cross each other on a lower substrate 1; a thin film transistor 30 formed at the crossing of the gate line 2 and the data line 4; a pixel electrode 22 connected to the thin film transistor 30; a lower alignment film (not shown) on the pixel electrode 22 for aligning the liquid crystal 50. The color filter array substrate 80 includes a black matrix formed on an upper substrate 11 for preventing light leakage; a color filter 12 for realizing color images; a common electrode 14 for forming a vertical electric field with the pixel electrode 22 of the thin film transistor array substrate 70; and an upper alignment film (not shown) on the common electrode 14.

FIG. 2 is a plan view of a cross-section of the lower substrate having a silver dot for supplying a common voltage to a common electrode shown in FIG. 1. A silver dot 10 for supplying a common voltage to the common electrode 14 is formed outside of a sealant 16, as shown in FIG. 2. The silver dot 10 is deposited in a paste state between the thin film transistor array substrate 70 and the color filter array substrate 80, and then the two substrates 70 and 80 are bonded together with the sealant 16. As a result, the silver dot 10 spreads out due to pressure applied to the substrates 70 and 80 when bonding the substrates.

To prevent the spread out silver dot 10 from being damaged by a subsequent scribing process, the silver dot must be formed well away from a scribing line. Several silver dots 6 for uniformly supplying a common voltage to the common electrode 14 are provided around the edges of the liquid crystal display panel. Because each of the silver dots must be formed well away from a scribing line, a lot of panel area around the edges of the liquid crystal display panel is wasted. Thus, panel area is not efficiently used, which increases fabrication costs.

To supply signals to the gate line 2 and the data line 4 provided on the thin film transistor array substrate 70, the liquid crystal display device also includes a gate driver and a data driver. The gate driver and the data driver are divided into a plurality of integrated circuits (hereinafter, referred to as 'IC') that are made as chips. Each of the drive IC chips are mounted in an opened IC area on a TCP (tape carrier package) or mounted on a TCP base film by a COF (chip on film) method, and is electrically connected to the liquid crystal display panel by a TAB (tape automated bonding) method. In this way, a fabricating method of the liquid crystal display device of the related art includes a process of separately fabricating the drive IC and bonding the drive IC chips to the liquid crystal display panel through a TCP. The bonding of the drive IC chips is complicated and increases the manufacturing cost of the liquid crystal display device.

SUMMARY OF THE INVENTION

Accordingly, the present invention is directed to a to a liquid crystal display device and a method of fabricating the same that substantially obviate one or more of the problems due to limitations and disadvantages of the related art.

An object of the present invention to provide a liquid crystal display device and a method of fabricating the same having a low unit cost.

Another object of the present invention to provide a liquid crystal display device and a method of fabricating the same that has a simplified assembly process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a common electrode on an upper substrate, a gate driver on a lower substrate facing an upper substrate, an insulating pattern on the common electrode, and a conductive sealant for bonding the upper and lower substrates together that overlaps the gate driver.

In another aspect, a fabricating method of a liquid crystal display device includes forming a gate driver on a lower substrate, forming a common electrode on an upper substrate, forming an insulating pattern on the common electrode and facing the gate driver, and forming a conductive sealant for bonding the upper and lower substrates together about the periphery of one of the upper and lower substrates, and bonding the upper and lower substrates together.

In another aspect, a liquid crystal display device includes a common electrode on an upper substrate, a connection pattern on the lower substrate, an insulating pattern on the common electrode corresponding to the connection pattern, and a conductive sealant overlapping the connection pattern for bonding the upper substrate and the lower substrate together.

In another aspect, a fabricating method of a liquid crystal display device includes forming a connection pattern on the lower substrate, forming a common electrode on an upper substrate, forming an insulating pattern on the common electrode corresponding to the connection pattern, and bonding the upper substrate and the lower substrate together with a conductive sealant overlapping the connection pattern.

In yet another aspect, a liquid crystal display device includes a common electrode on an upper substrate, a connecting part on the lower substrate on a lower substrate facing an upper substrate, and a conductive sealant for bonding the upper and lower substrates together that overlaps connecting part, wherein the conductive sealant includes a conductive ball that connects the connecting part on the lower substrate to the common electrode on the upper substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 12 is another cross-sectional view of a liquid crystal display device taken along line III-III' shown in FIG. 10.

DETAILED DESCRIPTION OF THE PREFERRED EMBODIMENTS

Reference will now be made in detail to the preferred embodiments of the present invention, examples of which are illustrated in the accompanying drawings.

A liquid crystal display device controls the light transmittance of liquid crystal having dielectric anisotropy by use of electric field, thereby displaying a picture. A liquid crystal display device includes a liquid crystal display panel where liquid crystal cells are arranged in a matrix, and a driver for driving the liquid crystal display panel. In the liquid crystal display panel, the liquid crystal cells control the light transmittance in accordance with pixel signals. The driver includes a gate driver for driving gate lines of the liquid crystal display panel; a data driver for driving data lines; a timing controller for controlling the drive timing of the gate driver and data driver; and a power supply for supplying a power signal required for driving the liquid crystal display panel and the drivers.

Figure 1:
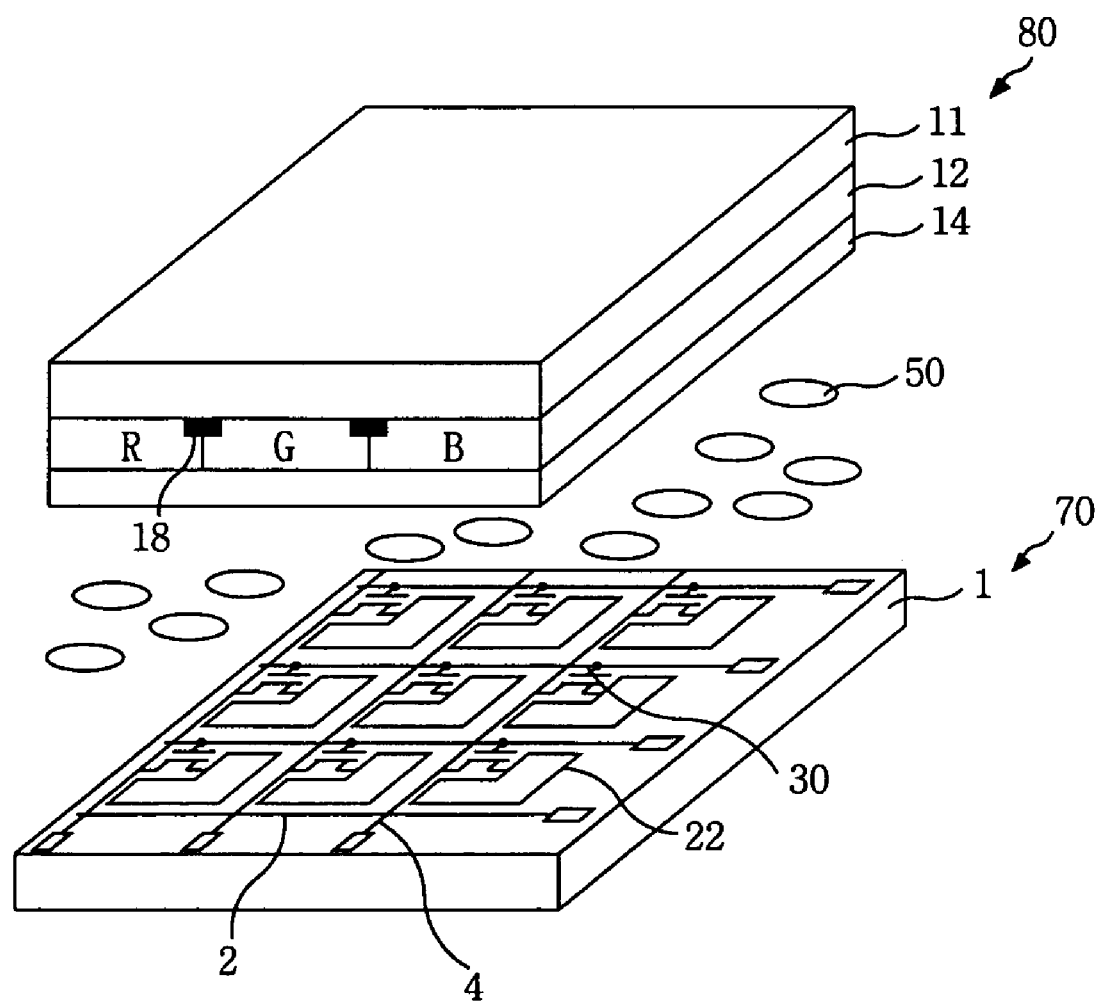
FIG. 1 is a plan view of a liquid crystal display device in the related art.
Figure 2:
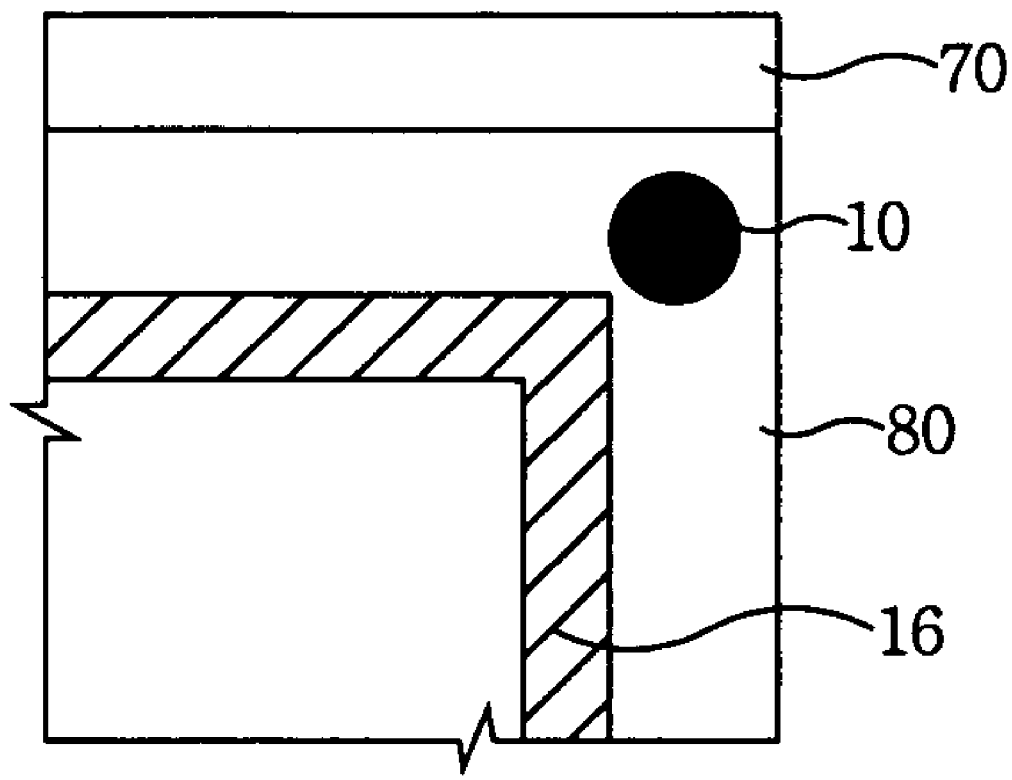
FIG. 2 is a plan view of a cross-section of the lower substrate having a silver dot for supplying a common voltage to a common electrode shown in FIG. 1.
Figure 3:
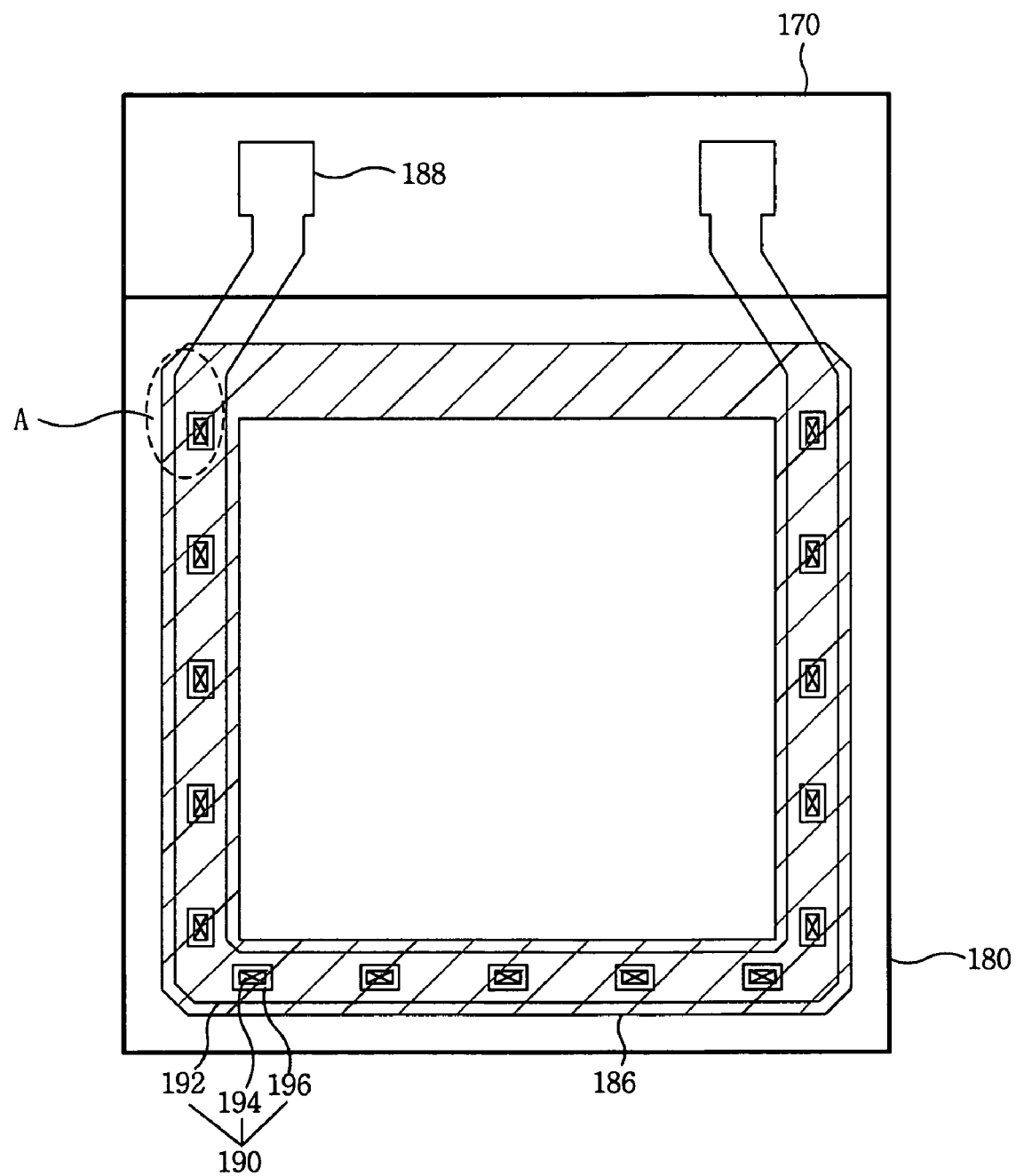
FIG. 3 is a plan view representing a liquid crystal display device according to a first embodiment of the present invention.

FIG. 3 is a plan view of a liquid crystal display panel according to a first embodiment of the present invention. Referring to FIG. 3, the liquid crystal display panel includes a thin film transistor substrate 170 on which a thin film transistor array is formed; a color filter substrate 180 on which a color filter array is formed; and a conductive sealant 186 for bonding the thin film transistor substrate 170 and the color filter substrate 180 together. The thin film transistor array substrate 170 has a thin film transistor array formed on a lower substrate, and the thin film transistor array includes a gate line (not shown) and a data line (not shown) that are formed to cross each other; a thin film transistor (not shown) formed at the crossing of a gate line and a data line; a pixel electrode (not shown) connected to the thin film transistor; and a lower alignment film (not shown) on the pixel electrode for aligning liquid crystal.

Figure 4:
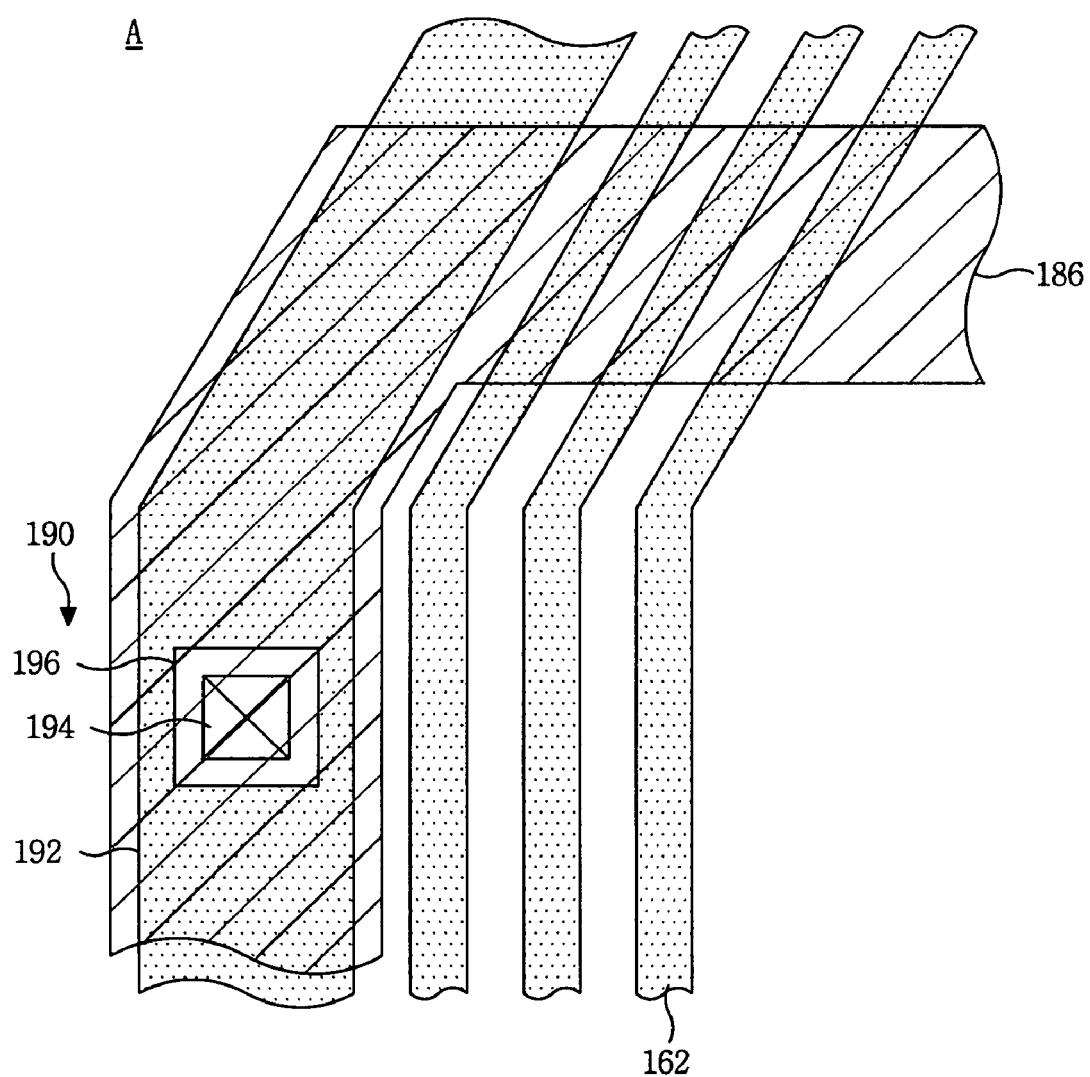
FIG. 4 is a plan view of an enlarged A area in FIG. 3.
Figure 5:
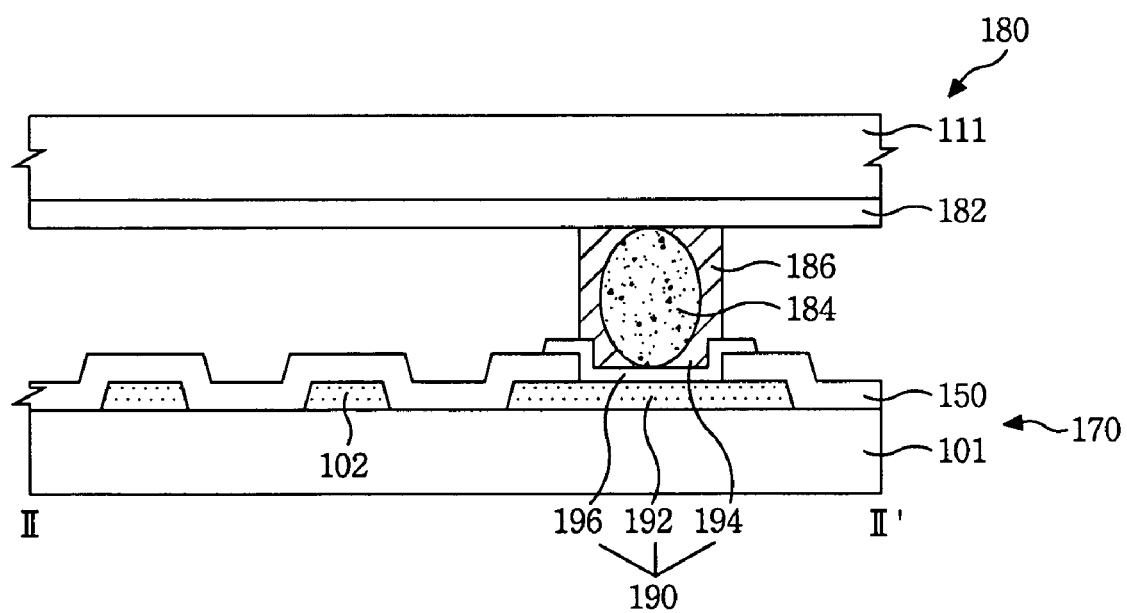
FIG. 5 is a cross-sectional view of a liquid crystal display device along line I-I' in FIG. 4.

FIG. 4 is a plan view of an enlarged A area in FIG. 3. FIG. 5 is a cross-sectional view of a liquid crystal display device along line I-I' in FIG. 4. The color filter array substrate 180 has a color filter array formed on an upper substrate 111, and the color filter array includes a black matrix (not shown) for preventing light leakage; a color filter (not shown) for realizing color; a common electrode 182 forming a vertical electric field with the pixel electrode; and an upper alignment film (not shown) on the common electrode 182 for aligning the liquid crystal (not shown).

As shown in FIGS. 4 and 5, a connecting part 190 on the thin film transistor substrate 170 is connected to the common electrode 182 by a conductive sealant 186. The connecting part 190, as shown in FIGS. 4 and 5, includes a first supply pattern 192 formed in an area overlapped by the conductive sealant 186; a second supply pattern 196 connected to the first supply pattern 192 through a supply contact hole 194 that penetrates an insulating film 150; and an electrical conductor 184 within the conductive sealant for connecting the second supply pattern 196 with the common electrode 182. A supply contact hole 194 penetrates an insulating film 150, including a gate insulating film and a passivation film, to expose the first supply pattern 192. In the first embodiment of the present invention, the conductive sealant 186 includes an electrical conductor 184 so as to create a conductive path between the common electrode 182 and the second supply pattern 196.

The first supply pattern 192 is formed of the same metal and in the same layer as the gate link 102 connected to the gate line. However, the first supply pattern 192 is formed to be separated from the gate link by a designated gap. Further, the first supply pattern 192 extends from a supply pad 188 that is connected to a power supply (not shown).

The second supply pattern 196 is formed of the same material and in the same layer as the pixel electrode (not shown). The second supply pattern 196 is formed in a line shape along the first supply pattern 102. In the alternative, the second supply pattern 196 can be formed in a dot shape so as to at least partially overlap the first supply pattern 192.

One of a conductive glass fiber and a conductive ball is used as the electrical conductor 184. A conductive ball can be formed by a ball spacer covered with a conductive material, such as silver (Ag) or gold (Au), so that the conductive ball can be conductive while maintaining a height between the color filter substrate 180 and the thin film transistor substrate 170. The conductive ball can keep the height even at a high pressure unlike the conductive ball included in an anisotropic conductive film (ACF). The electrical conductor 184 is mixed with a sealant to form a conductive sealant 186.

The first embodiment of the present invention includes the conductive sealant 186 having the electrical conductor 184, thereby enabling the application of a common voltage to the common electrode of the color filter array substrate 180 without a separate silver dotting process. Further, the conductive sealant 186 bonds the color filter substrate 180 and the thin film transistor substrate 170 together. In this case, the separate silver dotting process is not necessary so that the process of connecting the common electrode is simplified.

Figure 6:
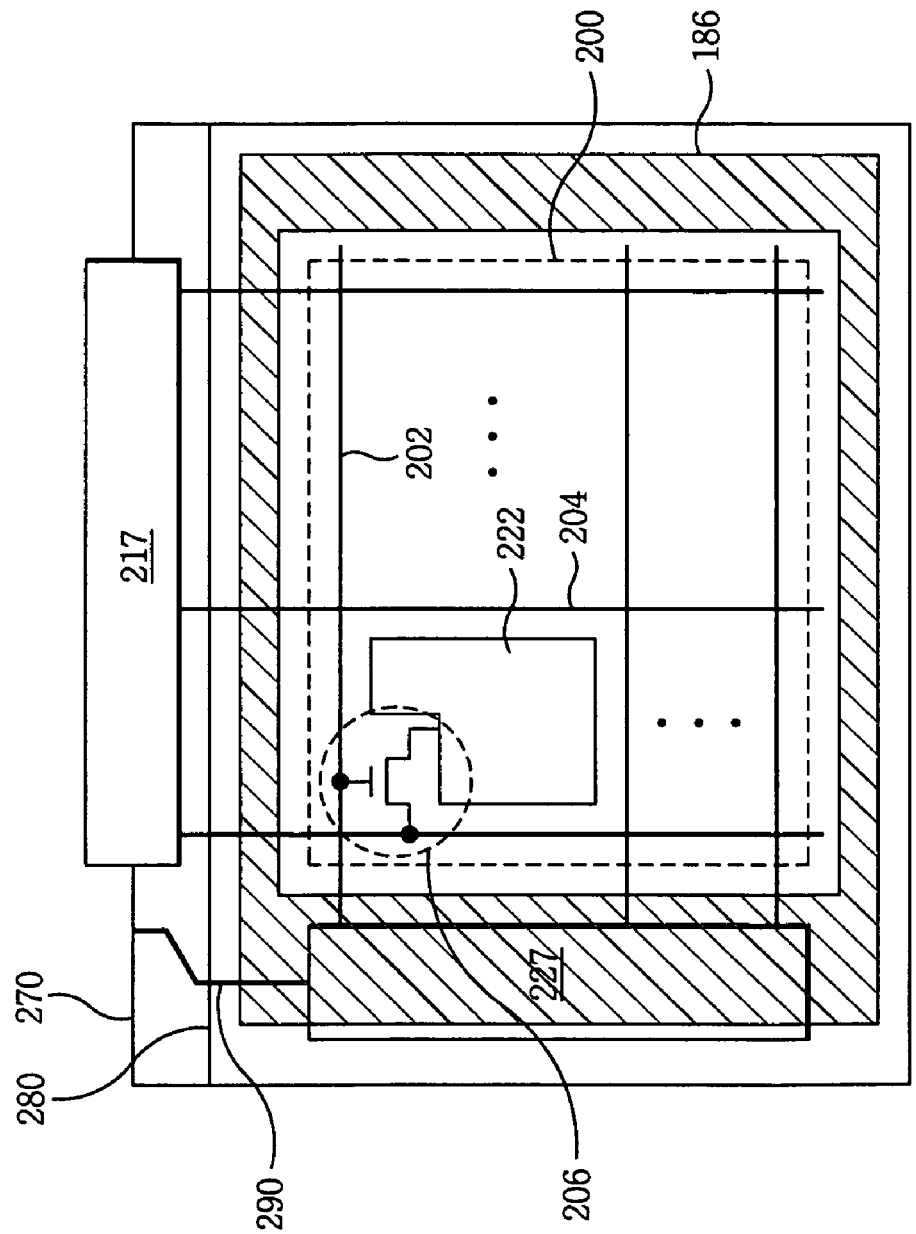
FIG. 6 is a plan view of a liquid crystal display device according to a second embodiment of the present invention.

FIG. 6 illustrates a liquid crystal display device according to a second embodiment of the present invention. Referring to FIG. 6, in the liquid crystal display device according to the second embodiment of the present invention, a gate driver 227 is mounted on the panel, and the conductive sealant 186 is used in the same manner as the first embodiment of the present invention to bond the thin film transistor array substrate 270 and the color filter array substrate 280 together. Further, the conductive sealant 186 includes the electrical conductor 184 in the same manner as the first embodiment. A path for supplying the common voltage through the electrical conductor 184 is provide through the conductive sealant 186 in the same manner as the first embodiment of the present invention, thus a description for this will be omitted.

The reason why the gate driver is mounted directly on the panel in the second embodiment of the present invention is to reduce the per unit cost of the liquid crystal display device and to simplify a module process. If the gate driver is directly mounted on the panel along with the formation of the gate line and the data line, the need for fabricating an integrated circuit of the gate driver separately and then adhering the integrated circuit to the panel part through a TCP is not necessary. Directly mounting the gate driver on the panel simplifies the connection process of the gate driver and reduces costs.

The liquid crystal display device according to the second embodiment of the present invention includes a thin film transistor substrate 270 on which a thin film transistor array is formed; a color filter substrate 280 on which a color filter array is formed; and a conductive sealant 186 for bonding the thin film transistor substrate 270 and the color filter substrate 280. The thin film transistor array substrate 270 has a thin film transistor array formed on a lower substrate, and the thin film transistor array includes a gate line 202 and a data line 204 that cross each other; a thin film transistor 206 formed at the crossing part thereof; a pixel electrode 222 connected to the thin film transistor 206; a lower alignment film spread thereon for aligning the liquid crystal.

A connecting part (not shown) is connected to the common electrode (not shown) through the electrical conductor provided in the conductive sealant 186 for applying a common voltage to the common electrode (not shown) is formed on the lower substrate, as described in the first embodiment of the present invention. Further, an LOG (line on glass) type line group 290, which receives gate control signals from the timing controller and power signals from the power supply is also formed on the lower substrate. The LOG type line group 290 is a signal line group, which is formed as a pattern on the lower substrate and is connected to the gate driver 227.

The conductive sealant 186, as shown in FIG. 6, is positioned about the periphery of the liquid crystal display panel. The conductive sealant 186 is not in the active array area 200 where the thin film transistor 206 is arranged. However, the conductive sealant 186 can be spread to overlap the gate driver 227, which is mounted on the panel.

Figure 7:
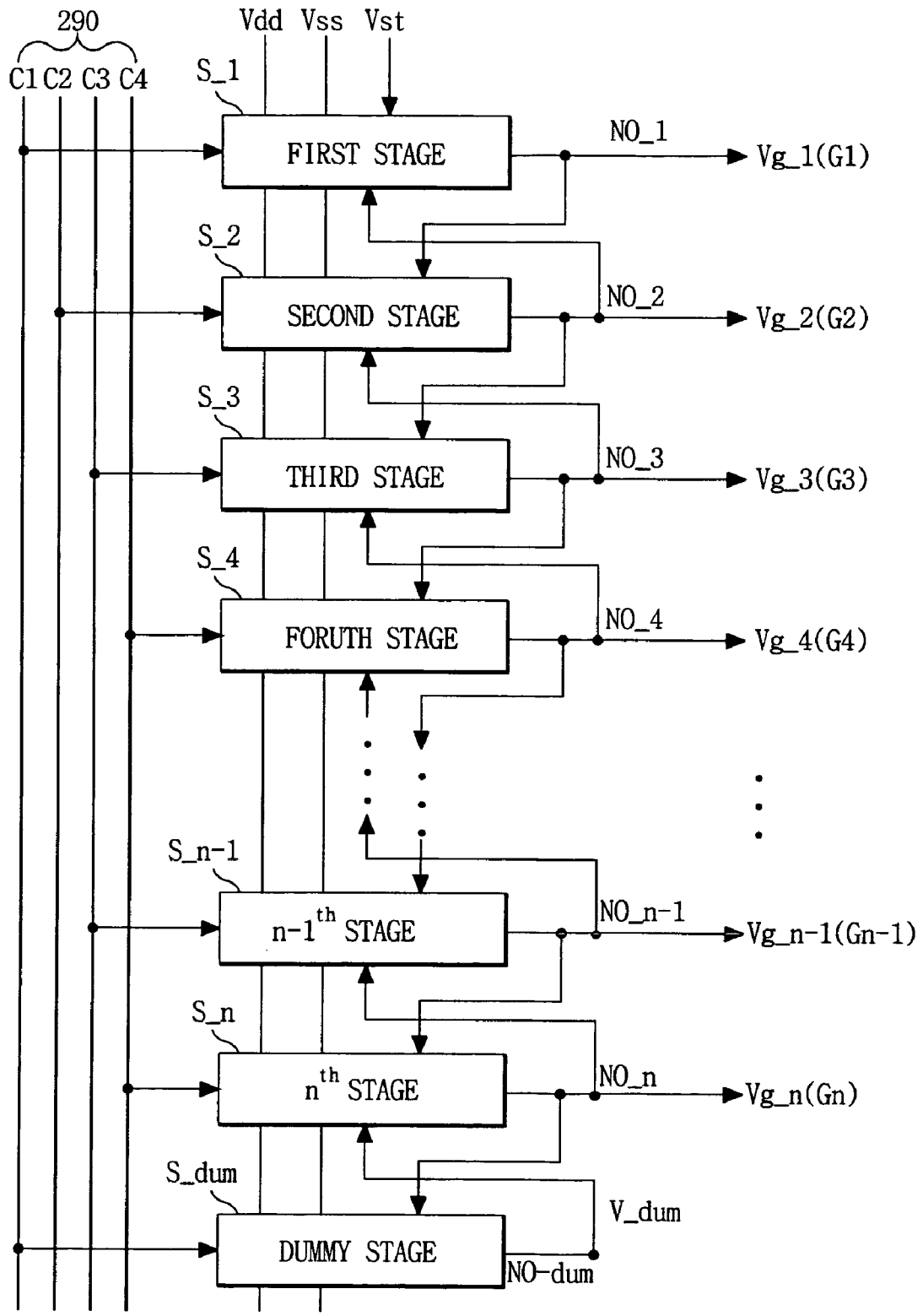
FIG. 7 is a plan view for explaining a gate driver of the liquid crystal display device in FIG. 6.

FIG. 7 is a plan view for explaining a gate driver of the liquid crystal display device in FIG. 6. The gate driver 227 has a plurality of gate drive IC's that each include: a shift register, which sequentially shift a start pulse for each horizontal period to generate a scan pulse; a level shifter for converting an output signal of the shift register into a swing width, which is suitable for driving the liquid crystal cell; and an output buffer connected between the level shifter and the gate line G1 to Gn. The gate driver 227 sequentially supplies a scan pulse to the gate lines G1 to Gn to select a horizontal line of the liquid crystal display panel to which the data is supplied.

FIG. 7 is an example of a shift register circuit configuration of the gate driver 227, and the shift register includes n number of stages S_1 to S_n and a dummy stage S_dum, which are connected in cascade. An output buffer and a level shifter (not shown) are installed between the stages S_1 to S_n and gate lines G1 to Gn. In the shift register, a start pulse Vst as a start pulse is inputted to a first stage S_1, and a pre-stage output signal Vg_1 to Vg_n−1 as the start signal is inputted to second to $n^{th}$ stages S_2 to S_n. And, a next stage output signal Vg_2 to Vg_n as a reset signal is inputted to the first to $(n-1)^{th}$ stages S_1 to S_n−1 and an output signal V_dum of the dummy stage as a reset signal is inputted to the $n^{th}$ stage. Further, each of the stages S_1 to S_n has the same circuit configuration, and shifts the start pulse Vst or the pre-stage output signal Vg_1 to Vgn_1 in response to any one clock signal among four clock signals C1 to C4 applied through the LOG line group 290, thereby generating a scan pulse which has a pulse width of one horizontal period. The circuit configuration of the stage S_1 to S_n and the number of the clock signals can be designed in a variety of ways.

Each stage S_1 to S_n includes a plurality of thin film transistors and sequentially supplies a scan pulse to the gate line in response to the start pulse or an output signal of the pre-stage stage and the clock signal. The number and shape of the thin film transistors included in each stage S_1 to S_n can be configured in accordance with a variety of designs. The thin film transistor formed within the stage S_1 to S_n includes a gate electrode, a source electrode and a drain electrode. Any one of the gate electrode, the source electrode and the drain electrode of the thin film transistor formed in each stage S_1 to S_n is connected to the LOG line group 290 which supplies the clock signal, thereby supplying a clock signal to each stage S_1 to S_n.

Figure 8:
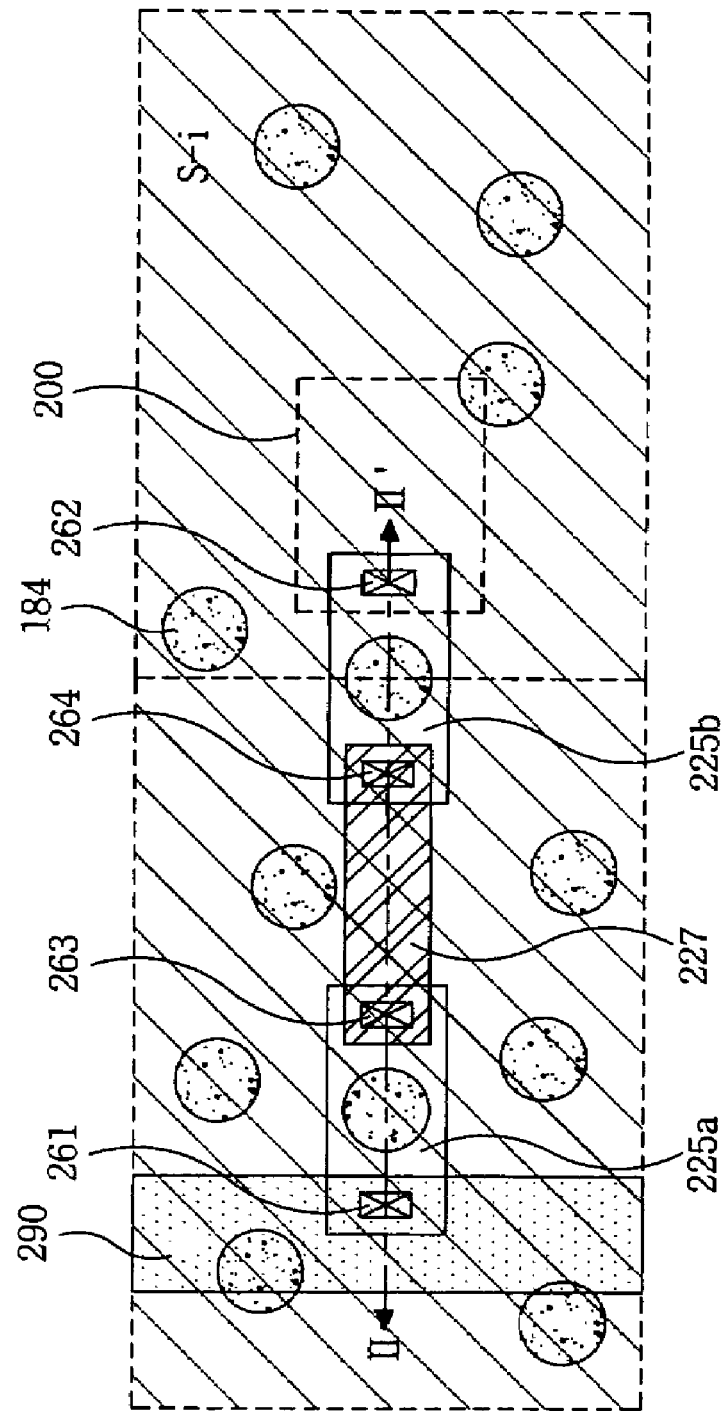
FIG. 8 is a plan view of a stage and an LOG line group in FIG. 7.
Figure 9:
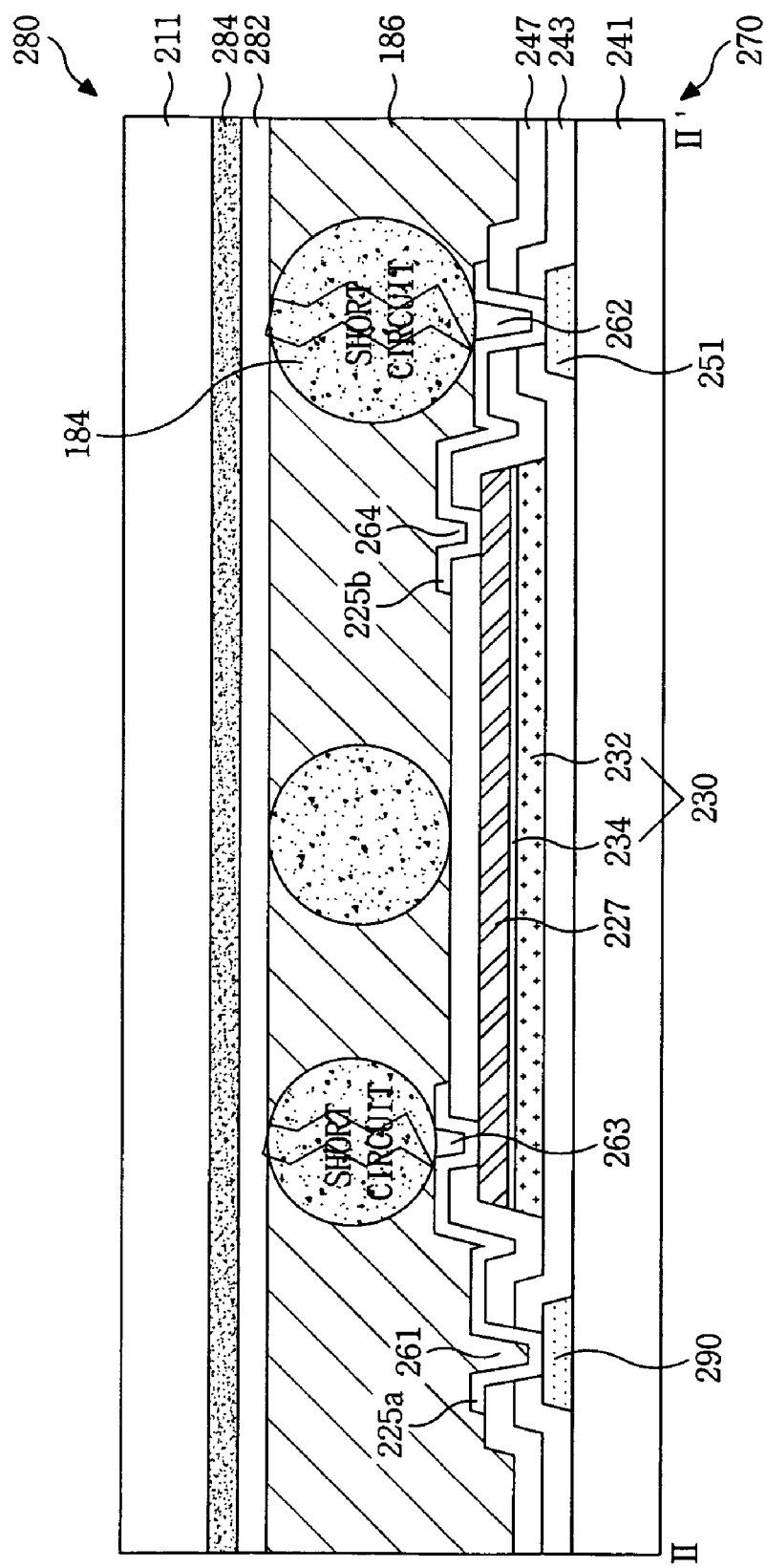
FIG. 9 is a cross-sectional view of a liquid crystal display device along line II-II' in FIG. 8.

FIG. 8 is a plan view of a stage and an LOG line group in FIG. 7. More specifically, FIG. 8 is a partial area of the liquid crystal display device shown in FIG. 6, and the partial area represents the ith stage S_i (but, i is a positive integer which is less than or equal to n) and the LOG line group 290 connected to the $i^{th}$ stage S_i in the shift register shown in FIG. 7. FIG. 9 is a cross-sectional view of a liquid crystal display device along line II-II' in FIG. 8. Referring to FIGS. 8 and 9, the thin film transistor array substrate 270 according to the second embodiment of the present invention includes the $i^{th}$ stage S_i and the LOG line group 290 on a lower substrate 241.

The LOG line group 290 includes signal lines that supply power signals, such as a gate low voltage VGL, a gate high voltage VGH, a common voltage VCOM, a ground voltage GND and a base drive voltage VCC; and gate control signals, such as a gate start pulse GSP, a gate shift clock signal GSC and a gate enable signal GOE. The $i^{th}$ stage S_i is connected to any one of the LOG line group 290 and has a plurality of thin film transistors 200 that supply the power signals VGL, VGH, VCOM, GND, VCC and the gate control signals GSP, GSC, GOE to the gate line. The thin film transistors 200 constituting the $i^{th}$ stage S_i can be formed in a variety of ways in accordance with the circuit configuration of the $i^{th}$ stage S_i. Therefore, according to the circuit configuration of the $i^{th}$ stage S_i, any one of the LOG line group 290 is connected to any one of the gate electrode, the source electrode, the drain electrode of the thin film transistor 200 included in the $i^{th}$ stage S_i. The connection of the LOG line group 290 and the thin film transistor 200 can be made through a first connection pattern 225A and a second connection pattern 225B.

FIG. 9 illustrates an exemplary connection of the gate electrode 251 of the thin film transistor 200 and the LOG group 290. To describe the connection relation of the gate electrode 251 and the LOG line group 290 in detail, the LOG line group 290 is formed of a gate metal on a lower substrate 241, and the gate electrode 251 is formed of the gate metal on the lower substrate 241 to be separate from the LOG line group 290. The LOG line group 290 and the gate electrode 251 are insulated through a gate insulating film 243, and an additional connection pattern 227 is formed on the gate insulating film 243. A passivation film 247 for protecting the additional connection pattern 227 is formed on the additional connection pattern 227 and the gate insulating film 243.

First to fourth contact holes 261, 262, 263, and 264 penetrating at least one of the gate insulating film 243 and the passivation film 247 are formed in the thin film transistor array substrate 270. A semiconductor pattern 230 inclusive of an active layer 232 and an ohmic contact layer 234 can be overlapped by the additional connection pattern 227. The first and third contact holes 261 and 263 are covered by a first connection pattern 225a and the second and fourth contact holes 262 and 264 are covered by a second connection pattern 225b. The first contact hole 261 exposes the LOG line group 290, the third and fourth contact holes 263 and 264 expose the additional connection pattern 227, and the second contact hole 262 exposes the gate electrode 251. Accordingly, the LOG line group 290 is connected to the additional connection pattern 227 through the first and third contact holes 261 and 263 and the first connection pattern 225a, and the gate electrode 251 is connected to the additional connection pattern 227 through the second and fourth contact holes 262 and 264 and the second connection pattern 225b. Accordingly, the signals supplied through the LOG line group 290 are transmitted to the gate electrode 251 of the $i^{th}$ stage S_i through the first connection pattern 225a, the additional connection pattern 227, and then the second connection pattern 225b.

Even without the additional connection pattern 227 and the third and fourth contact holes 263 and 264, the LOG line group 290 and the gate electrode 251 can be connected through the connection pattern of one line, which covers the first contact hole 261 and the second contact hole 264. However, the first and second connection patterns 225a and 225b are formed of a transparent conductive metal that has high resistance, such as ITO, and an increase in resistance is in proportion to the length of the conductive metal. Accordingly, in the case of forming the first and second connection patterns 225a and 225b separately, the length of the conductive metal, which constitutes the connection pattern, is shorter than in the case of forming the connection pattern as one line. Thus, resistance of the connection pattern is reduced so that signals can be transmitted with less line loss.

The color filter array substrate 280 bonded to the thin film transistor array substrate 270 according to the foregoing second embodiment has a black matrix 284 for preventing light leakage; and a common electrode 282 for receiving the common voltage, on an upper substrate 211. The color filter array substrate 280 and the thin film transistor array substrate 270 are bonded by the conductive sealant 186. The conductive sealant 186 includes an electric conductor 184 for connecting the common electrode 282 of the color filter array substrate 280 and the connection pattern 225a and 225b of the thin film transistor array substrate 270.

A liquid crystal display device according to a third embodiment of the present invention has the driver mounted on the panel in the same manner as the second embodiment of the present invention, and the conductive sealant 186 is used in the same manner as the first embodiment of the present invention to bond the color filter array substrate 380 and the thin film transistor array substrate 370. Further, a path of supplying the common voltage is also provided through the conductive sealant 186 as in the first embodiment of the present invention. Thus, a description of these features will be omitted.

Figure 10:
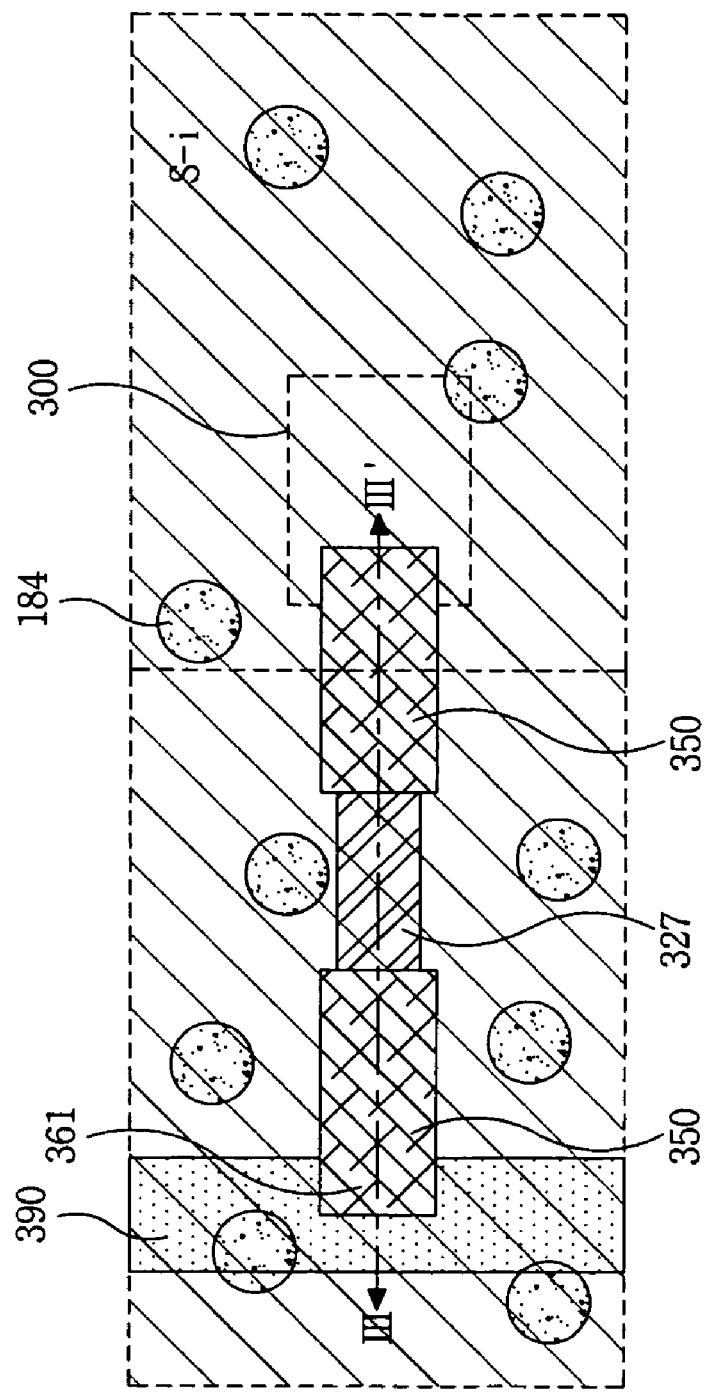
FIG. 10 is a plan view of a liquid crystal display device according to a third embodiment of the present invention.
Figure 11:
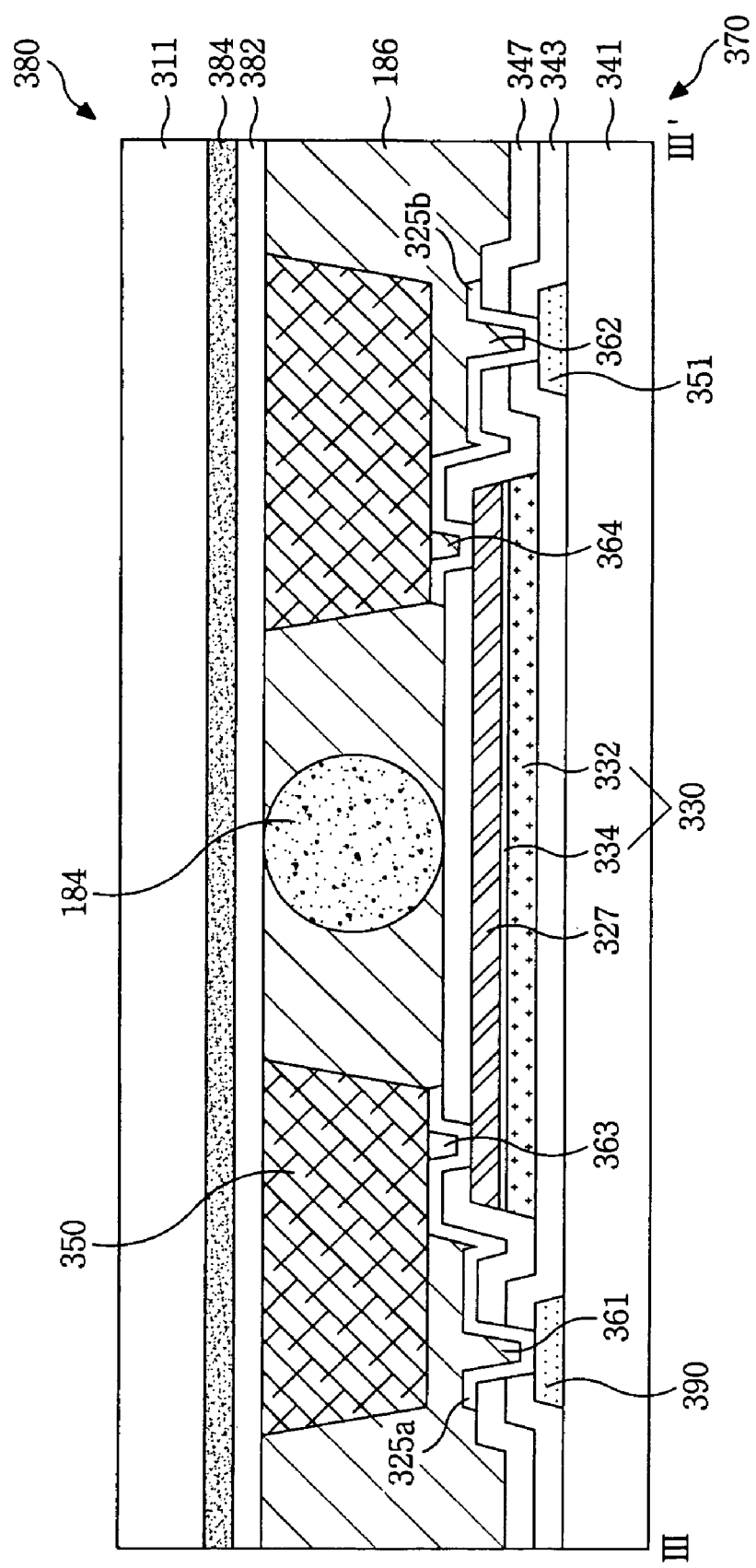
FIG. 11 is a cross-sectional view of a liquid crystal display device along line III-III' in FIG. 10.

FIG. 10 is a plan view of a liquid crystal display device according to a third embodiment of the present invention, and FIG. 11 is a cross-sectional view of a liquid crystal display device along line III-III' in FIG. 10. More specifically, a partial area of the liquid crystal display device is shown in FIGS. 10 and 11 representing the $i^{th}$ stage S_i (but, i is a positive integer which is less than or equal to n) and the LOG line group 390 connected to the $i^{th}$ stage S_i in the shift register. As shown in FIGS. 10 and 11, the thin film transistor array substrate 370 according to the third embodiment of the present invention includes the $i^{th}$ stage S_i and the LOG line group 390 on a lower substrate 341.

The LOG line group 390 includes signal lines which supply power signals, such as a gate low voltage VGL, a gate high voltage VGH, a common voltage VCOM, a ground voltage GND and a base drive voltage VCC; and gate control signals such as a gate start pulse GSP, a gate shift clock signal GSC and a gate enable signal GOE. The $i^{th}$ stage S_i is connected to any one of the LOG line group 390 and has a plurality of thin film transistors 300 that supply the power signals VGL, VGH, VCOM, GND, VCC and the gate control signals GSP, GSC, GOE to the gate line. The thin film transistors 300 constituting the $i^{th}$ stage S_i can be formed in a variety of ways in accordance with the circuit configuration of the $i^{th}$ stage S_i. Therefore, according to the circuit configuration of the $i^{th}$ stage S_i, one of the LOG line group 390 is connected to one of the gate electrode, the source electrode, the drain electrode of the thin film transistor 300 included in the $i^{th}$ stage S_i. The connection of the LOG line group 390 and the thin film transistor 300 can be made through a first connection pattern 325A and a second connection pattern 325B.

FIG. 11 illustrates an exemplary connection of the gate electrode 351 of the thin film transistor 300 and the LOG group 390. The LOG line group 390 is formed of a gate metal on a lower substrate 341, and the gate electrode 351 is formed of the gate metal on the lower substrate 341 separate from the LOG line group 390. The LOG line group 390 and the gate electrode 351 are insulated by a gate insulating film 343, and an additional connection pattern 327 is formed over the gate insulating film 343. A passivation film 347 for protecting the additional connection pattern 327 is formed on the additional connection pattern 327 and the gate insulating film 343.

First to fourth contact holes 361, 362, 363, 364 penetrating at least one of the gate insulating film 343 and the passivation film 347 are formed in the thin film transistor array substrate 370. A semiconductor pattern 330 inclusive of an active layer 332 and an ohmic contact layer 334 can be overlapped by the additional connection pattern 327. The first and third contact holes 361 and 363 are covered by a first connection pattern 325a and the second and fourth contact holes 362 and 364 are covered by a second connection pattern 325b. The first contact hole 361 exposes the LOG line group 390, the third and fourth contact holes 363 and 364 expose the additional connection pattern 327, and the second contact hole 362 exposes the gate electrode 351. Accordingly, the LOG line group 390 is connected to the additional connection pattern 327 through the first and third contact holes 361 and 363 and the first connection pattern 325a, and the gate electrode 351 is connected to the additional connection pattern 327 through the second and fourth contact holes 362 and 364 and the second connection pattern 325b. Accordingly, the signals supplied through the LOG line group 390 are transmitted to the gate electrode 351 of the $i^{th}$ stage S_i through the first connection pattern 325a, the additional connection pattern 327, and then the second connection pattern 325b.

Even without the additional connection pattern 327 and the third and fourth contact holes 363 and 364, the LOG line group 390 and the gate electrode 351 can be connected through the connection pattern of one line, which covers the first contact hole 361 and the second contact hole 364. However, the first and second connection patterns 325a and 325b are formed of a transparent conductive metal having a high resistance, such as ITO, and the resistance of the conductive metal is in proportion to the length of the conductive metal. Accordingly, in the case of forming the first and second connection patterns 325a and 325b separately, the length of the conductive metal that constitutes the connection pattern is shorter than in the case of the connection pattern as one line. Thus, the resistance of the connection pattern is reduced so that signals can be transmitted with less line losses.

The color filter array substrate 380 bonded to the thin film transistor array substrate 370 according to the foregoing third embodiment has a black matrix 384 for preventing light leakage; and a common electrode 382 for receiving the common voltage, on an upper substrate 311. Further, the color filter array substrate 380 includes an insulating pattern 350 in an area corresponding to the first and second connection patterns 325a and 325b of the thin film transistor array substrate 270. The insulating pattern 350 prevents a phenomenon in which a short circuit occurs between the common electrode 382 of the color filter array substrate 380 and the connection pattern 325a and 325b of the thin film transistor array substrate 370.

FIG. 12 is another cross-sectional view of a liquid crystal display device taken along line III-III' shown in FIG. 10. When the color filter array substrate 380 and the thin film transistor array substrate 370 are bonded by the conductive sealant 186, the insulating pattern 350 formed of an insulating material is disposed between the common electrode 382 and the connection pattern 325a and 325b so that the common electrode 382 is electrically insulated from the connection pattern 325a and 325b although a conductive ball 184 contacts the connection pattern 325 and the insulating pattern 350. The common electrode 382 and the connection pattern 325a and 325b are insulated, thus the fabrication process of the liquid crystal display device can be stabilized. Further, a thickness (t1) of the insulating pattern 350, as shown in FIG. 12, can be formed to be less than a thickness of a spacer, which maintains a cell gap between the color filter array substrate 380 and the thin film transistor array substrate 370. In other words, the thickness (t1) of the insulating pattern 350 can be formed to be less than the cell gap. Even though the thickness (t1) of the insulating pattern 350 is formed to be less than the cell gap, the common electrode 382 is insulated from the conductive spacer 184 by the insulating pattern 350. Accordingly, it is irrelevant that the thickness (t1) of the insulating pattern 350 is formed to be not greater than the cell gap. Thus, the insulating pattern 350 can be formed either on the connection pattern 325a and 325b of the thin film transistor array substrate 370 or the color filter array substrate 380.

Figure 13A:
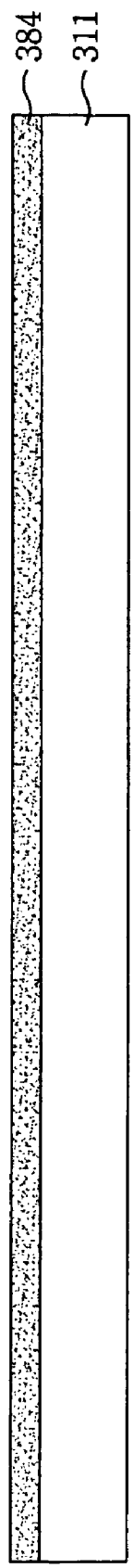
FIGS. 13A to 13C are views for explaining a process of fabricating a color filter array substrate of the liquid crystal display device according to the third embodiment of the present invention.
Figure 13B:
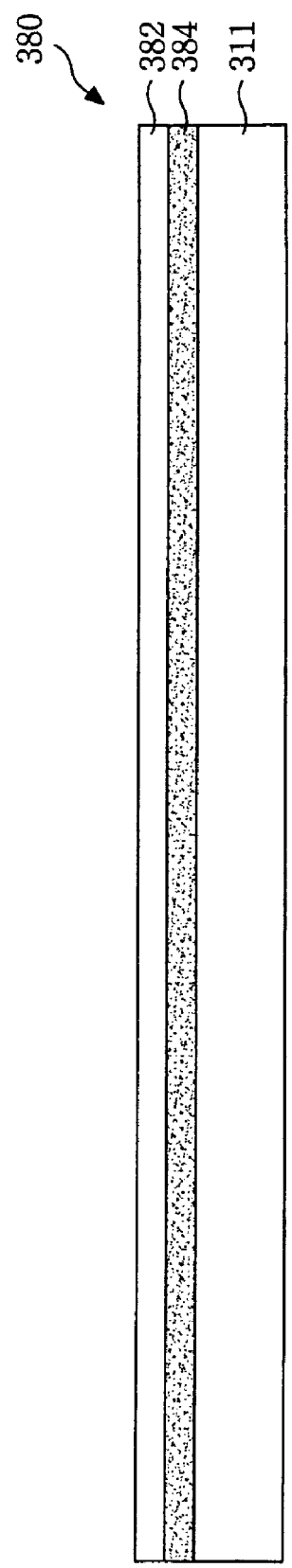
Figure 13C:
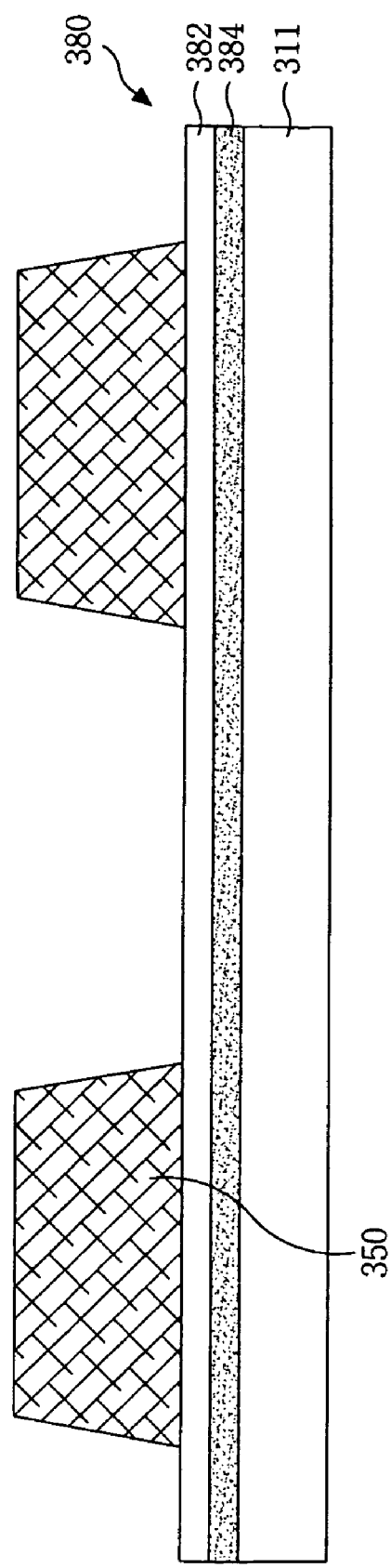

FIGS. 13A to 13C are views for explaining a process of fabricating a color filter array substrate of the liquid crystal display device according to the third embodiment of the present invention. Referring to FIG. 13, a black matrix 384 for preventing light leakage is formed on an upper substrate 311. The black matrix 384 is formed by patterning an opaque metal material or opaque resin by use of a photolithography process using a mask and an etching process after depositing the opaque metal material or opaque resin.

Referring to FIG. 13B, a common electrode 382 for controlling the movement of liquid crystal is formed on the upper substrate 311 on which the black matrix is formed. The common electrode 382 is formed by depositing a transparent conductive material, such as ITO. Further, the common electrode 382 is formed in an active array area (not shown) after forming red, green and blue color filter arrays on the upper substrate 311 where the black matrix is formed.

Referring to FIG. 13C, the insulating pattern 325a and 325b for preventing the short circuit of the color filter array substrate 380 and the thin film transistor array substrate 370 is formed on the upper substrate 311 on which the common electrode 382 is formed. The insulating pattern 350 is formed by the photolithography process using the mask and the etching process after spreading an organic insulating material inclusive of polyacrylate, etc on the entire surface. Further, the insulating pattern 350 can be formed along with the spacer which is formed in the active array area for keeping the cell gap of the liquid crystal display device.

A diffractive exposure mask or a halftone mask is applied to form the thickness of the insulating pattern 350 less than the spacer which is formed to keep the cell gap. A method of forming the insulating pattern which is lower in height than the spacer by applying the diffractive exposure mask and the halftone mask is as follows. It is possible to form a photo-resist pattern of a first height and a second height which is lower than the first height by applying the diffractive exposure mask and the halftone mask. The spacer is formed in an area corresponding to the photo-resist pattern of the first height, and the insulating pattern is formed in an area corresponding to the photo-resist pattern of the first height. To fully describe a process of forming the spacer and the insulating pattern, the polyacrylate is etched by use of the first and second photo-resist patterns. After then, the photo-resist pattern of the first and second heights is ashed, thereby removing the photo-resist pattern of the second height. The polyacrylate in the lower part of the photo-resist pattern of the second height is exposed since the photo-resist pattern of the second height is removed, and the exposed polyacrylate is partially etched to form the insulating pattern. The photo-resist pattern of the first height, which is decreased in height by the ashing process, is removed by a stripping process after forming the insulating pattern, thereby completing all of the spacer and the insulating pattern, which is lower in height than the spacer.

The color filter array substrate 380 is fabricated by the method described with regard to FIGS. 13A to 13C, and the thin film transistor array substrate 370 according to the third embodiment of the present invention is provided, and then the color filter array substrate 380 and the thin film transistor array substrate 370 are bonded by the conductive sealant 186.

As described above, the liquid crystal display device according to the first embodiment of the present invention connects the common electrode to the common line through the conductive sealant having an electric conductor, thus the common voltage can be applied without the silver dotting process. The liquid crystal display device according to the second embodiment of the present invention uses the conductive sealant and mounts the gate driver on the panel so that the fabrication process of the liquid crystal display device is simplified and unit costs are lowered. The liquid crystal display device according to the third embodiment of the present invention uses the conductive sealant, mounts the gate driver on the panel and has the insulating pattern on the color filter array substrate which faces the gate driver so that it is possible to prevent a short circuit phenomenon between the color filter array substrate and the gate driver of the liquid crystal display device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a common electrode on an upper substrate;
   a gate driver on a lower substrate facing an upper substrate;
   an insulating pattern on the common electrode; and
   a conductive sealant for bonding the upper and lower substrates together that overlaps the gate driver,
   wherein the gate driver includes:
   at least one signal line group on the lower substrate to supply power signals and gate control signals; and
   a plurality of thin film transistors connected to the at least one signal line group,
   a gate insulating film covering the at least one signal line group;
   an additional connection pattern on the gate insulating film;
   a passivation film covering the gate insulating film and the thin film transistor;
   a first contact hole penetrating the gate insulating film and the passivation film to expose the at least one signal line group;
   a second contact hole penetrating the passivation film to expose the thin film transistor;
   third and fourth contact holes penetrating the passivation film to expose the additional connection pattern;
   a first connection pattern on the passivation film for connecting the at least one signal line group to the additional connection pattern through the first contact hole and the third contact hole; and
   a second connection pattern formed on the passivation film for connecting the thin film transistor to the additional connection pattern through the second contact hole and the fourth contact hole.

2. The liquid crystal display device according to claim 1, wherein the lower substrate has a connecting part connected to the common electrode by the conductive sealant.

3. The liquid crystal display device according to claim 2, wherein the conductive sealant includes a conductive ball that connects the connecting part to the common electrode on the upper substrate.

4. The liquid crystal display device according to claim 1, wherein the thickness of the insulating pattern is equal to or less than a cell gap between the upper substrate and the lower substrate.

5. The liquid crystal display device according to claim 1, wherein the insulating pattern is overlapped by the first and second connection patterns.

6. The liquid crystal display device according to claim 1, wherein the conductive sealant overlaps the gate driver.

7. A liquid crystal display device, comprising:
   a common electrode on an upper substrate;
   a connection pattern on a lower substrate;
   an insulating pattern on the common electrode corresponding to the connection pattern; and
   a conductive sealant overlapping the connection pattern for bonding the upper substrate and the lower substrate together,
   wherein the insulating pattern prevents a short circuit from between the common electrode and the connection pattern.

8. The liquid crystal display device according to claim 7, wherein the conductive sealant includes a conductive ball that contacts the connection pattern on the lower substrate and the insulating pattern on the common electrode of the upper substrate.

* * * * *